United States Patent
Faccin et al.

(10) Patent No.: US 7,024,688 B1
(45) Date of Patent: Apr. 4, 2006

(54) TECHNIQUES FOR PERFORMING UMTS (UNIVERSAL MOBILE TELECOMMUNICATIONS SYSTEM) AUTHENTICATION USING SIP (SESSION INITIATION PROTOCOL) MESSAGES

(75) Inventors: Stefano Faccin, Dallas, TX (US); Franck Le, Irving, TX (US); György Wolfner, Budapest (HU)

(73) Assignee: Nokia Corporation, Espoo (FI)

( * ) Notice: Subject to any disclaimer, the term of this patent is extended or adjusted under 35 U.S.C. 154(b) by 704 days.

(21) Appl. No.: 09/630,425

(22) Filed: Aug. 1, 2000

(51) Int. Cl.
  G06F 15/16 (2006.01)
  G06F 17/30 (2006.01)
  G06F 7/04 (2006.01)
  G06F 19/00 (2006.01)
  H04L 9/32 (2006.01)

(52) U.S. Cl. .......................... 726/4; 380/247; 380/248; 380/249; 709/227; 709/228; 709/229; 709/225; 713/151; 713/160; 713/161; 713/168; 713/170

(58) Field of Classification Search ........ 380/247–249, 380/257; 713/200–202; 709/227–229, 204
See application file for complete search history.

(56) References Cited

U.S. PATENT DOCUMENTS 6,477,644 B1 * 11/2002 Turunen ................... 713/161
6,693,886 B1 * 2/2004 Haikonen et al. .......... 370/338

OTHER PUBLICATIONS

Satellte-UMTS service provision using IP-based technology □□Fan, L; Sherif, R.E.; Gardiner, J.G.;□□Vehicular Technology Conference Proceedins, 2000 VTC 2000-□□Spring Tokyo 2000 IEEE 51st, vol. 3, May 15-18, 2000□□p.: 1970-1974 vol. 3.*
IETF Draft Standard RFC 2617, issued Jun. 1999.
3GPP Technical Specification TS 33.102, issued Jul. 2000.
M. Handley et al., "SIP: Session Initiation Protocol", IETF RFC 2543, Mar. 1999, p. 113, section 14-p. 119, section 15.3.
"Universal Mobile Telecommunications System (UMTS); 3G Security; Security Architecture (3G TS 33.102 version 3.5.0 Release 1999)", ETSI TS 133 102 V3.5.0, Jul. 2000, p. 18, section 6.3-p. 22, section 6.3.3.
IEFT Draft Standard RFC 2543, issued Mar. 1999.

* cited by examiner

*Primary Examiner*—Ayaz Sheikh
*Assistant Examiner*—Longbit Chai
(74) *Attorney, Agent, or Firm*—Squire, Sanders & Dempsey L.L.P.

(57) ABSTRACT

A technique for authenticating a user to a server using SIP messages includes forwarding an SIP request from the user agent to the server. The server then forwards a request for authentication to the user agent in response to the invite request, the request for authentication including information that the authentication will be performed using a UMTS AKA mechanism. The user agent then forwards and authentication response to the server in accordance with the UMTS AKA mechanism and the server then performs the appropriate actions to perform an invoked SIP procedure in response to the SIP request. The SIP request may include any standardized SIP request including an SIP INVITE request or an SIP REGISTER request.

39 Claims, 1 Drawing Sheet

TECHNIQUES FOR PERFORMING UMTS (UNIVERSAL MOBILE TELECOMMUNICATIONS SYSTEM) AUTHENTICATION USING SIP (SESSION INITIATION PROTOCOL) MESSAGES

BACKGROUND OF THE INVENTION

1. Field of the Invention

The present invention relates to techniques for performing authentication using SIP (Session Initiation Protocol) messages. More particularly, the present invention relates to techniques for performing UMTS (Universal Mobile Telecommunications System) authentication using SIP messages.

2. Description of the Related Art

The SIP has been selected as the protocol over the UNI (User to Network Interface), that is, the interface between the mobile subscriber and the CSCF (Call State Control Function), for R00 (release 2000) and the current UMTS AKA (Authentication and Key Agreement) is one proposal for the authentication mechanism for the R00 UMTS.

The SIP has been defined in the IETF (Internet Engineering Task Force) draft standard RFC2543 (Request For Comments), issued March 1999 and the UMTS AKA has been defined in the 3GPP (3d Generation Partnership Project) specification TS 33.102, version 3.5.0, Release 1999, issued July 2000. The contents of this draft standard in its entirety and the contents of this specification in its entirety are both incorporated by reference herein.

As stated in the draft standard:

The Session Initiation Protocol (SIP) is an application-layer control (signaling) protocol for creating, modifying and terminating sessions with one or more participants. The sessions include Internet multimedia conferences, Internet telephone calls and multimedia distribution. Members in a session can communicate via multicast or via a mesh of unicast relations, or a combination of these.

SIP invitations used to create sessions carry session descriptions which allow participants to agree on a set of compatible media types. SIP supports user mobility by proxying and redirecting requests to the user's current location. Users can register that current location. SIP is not tied to any particular conference control protocol. SIP is not designed to be independent of the lower-layer transport protocol and can be extended with additional capabilities.

However, the use of the UMTS AKA procedure to perform authentication through SIP messages has not been disclosed in the draft standard.

Furthermore, in the IP Multimedia (IM) subsystem, which supports mobile IP telephony, a subscriber authentication mechanism must be standardized. Such an authentication mechanism has not yet been standardized. However, the UMTS AKA procedure will most likely be the chosen authentication mechanism. Therefore, a technique to perform UMTS AKA using the SIP protocol must be defined.

SUMMARY OF THE INVENTION

An object of the present invention, therefore, is to provide techniques for performing authentication using the UMTS AKA procedure and carrying the corresponding UMTS parameters through SIP messages. The authentication may be performed either by creating a new UMTS AKA authentication mode with the appropriate fields contained within an SIP message or alternatively, the authentication may be performed by reusing and adapting an existing authentication mode (e.g.—the digest mode or the PGP mode) of an SIP message.

Another object of the present invention, in the case of an IM subsystem, is to use SIP messages, which have been selected to be used as the call control protocol between the UE (User Equipment) and the CSCF, to carry the authentication parameters.

Still another object of the present invention is to reuse the UMTS AKA mechanism as a possible solution for the authentication procedure in the IM subsystem.

A further object of the present invention is to define which SIP messages and header fields are to be used to carry the UMTS authentication parameters in order to use the UMTS AKA mechanism for subscriber authentication in the IM subsystem and how to include the UMTS authentication parameters in the SIP header fields.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing exemplary embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION OF THE INVENTION

Figure 1:
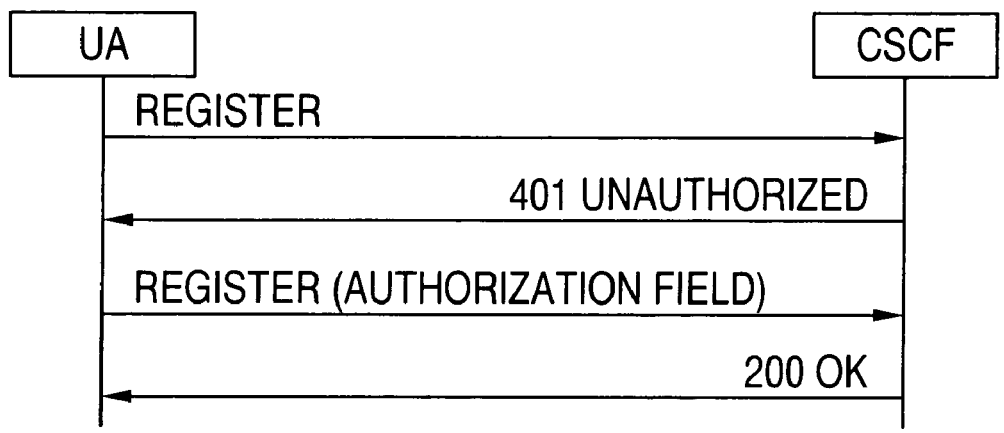
FIG. 1 illustrates an example of data flow between an SIP UA (User Agent) and a CSCF.

Before beginning a detailed description of the subject invention, discussion of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. In addition, elements may not be shown within the drawing figures for simplicity of illustration and discussion and so as not to obscure the invention.

FIG. 1 illustrates an example of data flow between an SIP UA and a CSCF. However, a Proxy server may be substituted for the CSCF. According to the security policies, when a UMTS AKA needs to be performed, (for example at a call setup or at registration), UA in the UE sends a REGISTER or INVITE request to the CSCF or Proxy. The CSCF or proxy can accept the registration with the 200 OK message or ask for an authorization with the 401 Unauthorized response.

According to the aforecited 3GPP specification, in order to execute a UMTS AKA procedure, two parameters must be sent to the user to authenticate it, namely, the RAND and the AUTN, and then the user will respond.

Therefore, the 401 Unauthorized response includes the WWW-Authenticate response header field which contains the required authorization scheme and related parameters. In performing the UMTS AKA procedure in accordance with a present invention, the WWW-Authenticate header includes the RAND (RANDom challenge) and AUTN (Authentication Token).

After a 401 response, the UA may send a new REGISTER or INVITE request, which should contain the appropriate authorization information in the Authorization header field. In the case of the UMTS AKA procedure in accordance with the present invention, the Authorization header contains the authentication response (RES) or the synchronization failure parameter (AUTS) or an error code (for example, an error message can be sent if the Message Authentication Code (MAC) is considered to be invalid).

Figure 2:
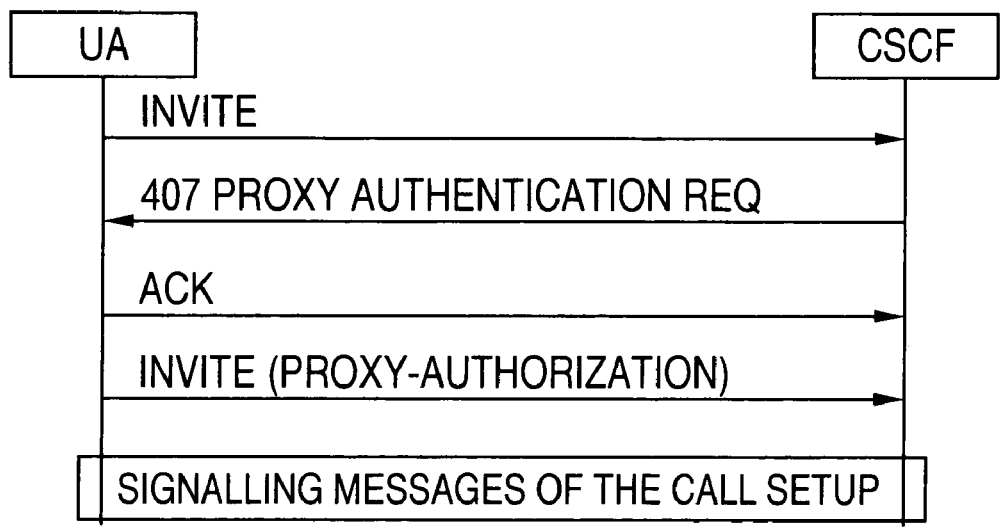
FIG. 2 illustrates an example of data flow between an SIP UA and a CSCF.

Referring now to FIG. 2, which illustrates proxy authentication after an INVITE request is presented, upon the UA forwarding an INVITE request to the CSCF, the CSCF may ask for an authentication with a 407 Proxy Authentication Required response. The 407 contains a Proxy-Authenticate response header field which contains the required authorization scheme and related parameters.

After receiving the 407 response, the UA sends an acknowledgment (ACK) response and may repeat the INVITE request, the repeated request containing the appropriate authentication information in the Proxy-Authorization header field.

In the case of the UMTS AKA procedure, the Proxy-Authenticate header contains the same information as the WWW-Authenticate header and the Proxy-Authorization header contains the same information as the Authorization header. Since this procedure can be used only when the UA sends a request, for example, when it initiates a call, the procedure cannot substitute for the authentication at registration.

Note that the REGISTER request, 200 OK message, and 401 Unauthorized response, as well as other parameters and elements contained in the above-noted discussion, are all clearly defined in the aforecited RFC2543 draft standard.

The aforecited draft standard defines three different techniques for SIP authentication, namely, an HTTP "basic" authentication mechanism and an HTTP "digest" authentication mechanism, and a PGP (Pretty Good Privacy) authentication mechanism. The HTTP authentication mechanisms are defined in the IETF draft standard RFC2617, issued June, 1999. The contents of this draft standard in its entirety are incorporated by reference herein.

While the three different techniques for SIP authentication are usable, for simplicity, the UMTS AKA technique may be advantageously used instead and the UMTS AKA elements may be substituted for the elements used for the three other SIP authentication techniques without needing a format revision in the SIP standard.

Accordingly, in accordance with the present invention, a 401 Unauthorized response includes a WWW-Authenticate response header field which contains the UMTS AKA authentication vectors, that is, the RAND (RANDom challenge) and the AUTN (authentication token).

After a 401 Unauthorized response, the UE sends a new REGISTER/INVITE request which should contain the appropriate authentication information in the Authorization header field: AUTS, or an error code can be sent if the MAC is considered to be invalid.

Note that for a call setup, as will be discussed below, a 407 Proxy Authentication Required response may alternatively be used to carry the UMTS AKA parameters.

The present invention defines two ways to carry the UMTS AKA parameters in the SIP messages:

As noted above, the SIP standard defines three different techniques for authentication, namely, the HTTP basic authentication method, the HTTP digest authentication method and the PGP authentication mechanism.

Therefore, a new authentication mode, a UMTS AKA mode, could be defined with the necessary fields. Alternatively, the existing modes can be reused and adapted in order to perform the UMTS AKA procedure.

In order to be able to use the UMTS AKA procedure for authentication in IM subsystems, it is necessary to define how the UMTS AKA parameters are contained within the SIP messages. A new authentication method or mode may be introduced to include the UMTS AKA parameters in SIP messages. Noted below is a new authentication mode in accordance with the present invention. The new authentication mode contains headers which have been made as short as possible.

The WWW-Authenticate response header, in the case of a UMTS AKA procedure, must be able to carry both the RAND and AUTN. Accordingly, one example of a simple format which may be used is as follows:

WWW-Authenticate="WWW-Authenticate" ":" "UMTS" RAND AUTN
RAND="RAND" "=" RAND -value
AUTN="AUTN" "=" AUTN -value A hexadecimal format may be used for both the RAND and AUTN values.

The Authorization header, in the case of a UMTS AKA procedure, must be able to carry the RES value or the AUTS value. Accordingly, one example of a simple format which may be used is as follows:

Authorization="Authorization" ":" "UMTS" RES | AUTS | AUTH-REJECT
RES="RES" "=" RES-value
AUTS="AUTS" "=" AUTS-value
AUTH-REJECT="AUTH-REJECT" "=" error-code A hexadecimal format may be used for both the RES and AUTS values.

The Proxy-Authenticate response header plays a role which is essentially the same as that of the WWW-Authenticate response header and therefore, one example of a similar format which may be used is as follows:

Proxy-Authenticate="Proxy-Authenticate" ":" "UMTS" RAND AUTN
RAND="RAND" "=" RAND-value
AUTN="AUTN" "=" AUTN-value Similarly, the Proxy-Authorization response header plays a role which is essentially the same as that of the Authorization response header and therefore, one example of a similar format which may be used is as follows:

Proxy-Authorization="Proxy-Authorization" ":" "UMTS" RES | AUTS | AUTH-REJECT
RES="RES" "=" RES-value
AUTS="AUTS" "=" AUTS-value
AUTH-REJECT="AUTH-REJECT" "=" error-code Thus, in the case of an authentication mechanism in accordance with the present invention for use in an IM subsystem, UMTS AKA authentication may be used as a new authentication mode.

Since HTTP's basic and digest authentication mechanisms have been defined for use in the SIP draft standard, as noted below, the portions of the SIP message reserved for the digest mechanism may be alternatively used in accordance with a present invention to carry the UMTS AKA parameters:

For example, the "nonce" field formally used by the digest mechanism may be used to carry the UMTS AKA concatenated RAND and AUTN values in a hexadecimal format. Since the contents of the nonce-field is implementation dependent, the length of the field must be large enough to carry the RAND and AUTN values. If this is not the case, the "opaque" field, defined in the draft standard, may be used to carry a portion of the UMTS AKA parameters.

The "response" field defined in the draft standard will be used for the UMTS AKA RES element. In case of a synchronization error, the AUTS will be included in the "response" field. The first character of the "response" field can indicate that the response includes the RES, the AUTS, or an error code. The RES and the AUTS may be in a hexadecimal format.

In authenticating with the SIP message portion formally used for the digest mode, an "algorithm" field which formally specified which algorithm to use to compute the digest (MD5 may be used by default), may, in accordance with the present invention, be used to inform the receiver that this is a UMTS AKA procedure and in this way, the receiver will understand that the nonce field actually carries the RAND and AUTN.

As noted above, the PGP mechanism has been defined for authentication use in the SIP draft standard. As alternative, this mode may be used in accordance with the present invention to carry the UMTS AKA parameters. That is:

The "nonce" field may carry the RAND and AUTN values.

The "PGP=algorithm" may inform the receiver that it is a UMTS AKA procedure.

The result will be included in the "PGP-signature". Since this field may be more than 200 bits long, some of the first bits of this field may be used to specify the type of result, e.g.—RES, AUTS, or error code.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A method of authenticating a user agent to a server using Session Initiation Protocol (SIP) messages, the method comprising:

forwarding a SIP request from the user agent to the server;

forwarding a request for authentication from the server to the user agent in response to the SIP request, the request for authentication including information that the authentication will be performed using a Universal Mobile Telecommunications System (UMTS) Authentication and Key Agreement (AKA) mechanism, wherein a field therein comprises AUTN (authentication token) and RAND (random challenge), and RAND and AUTN vectors are included in a SIP WWW-Authenticate or a Proxy-Authenticate response header field;

forwarding an authentication response from the user agent to the server in response to the request for authentication in accordance with the UMTS AKA mechanism wherein a field therein comprises RES (response) and AUTS (synchronization failure parameter); and performing an invoked SIP procedure on the server in response to the SIP request if the authentication is deemed successful in view of the authentication response.

2. The method of claim 1, wherein the SIP request comprises one of a SIP INVITE request or a SIP REGISTER request.

3. The method of claim 2 wherein AUTN and RAND are contained in an authenticate header.

4. The method of claim 2 wherein RES and AUTS are contained in an authorization header.

5. The method of claim 1, wherein the request for authentication comprises one of a SIP 401 Unauthorized code or a SIP 407 Proxy Authentication Required code.

6. The method of claim 5 wherein AUTN and RAND are contained in an authenticate header.

7. The method of claim 5 wherein RES and AUTS are contained in an authorization header.

8. The method of claim 1, wherein the authentication response an error code.

9. The method of claim 8, wherein the authentication response is included in a SIP Authorization or a Proxy-Authorization header field.

10. The method of claim 8 wherein AUTN and RAND are contained in an authenticate header.

11. The method of claim 8 wherein RES and AUTS are contained in an authorization header.

12. The method of claim 9 wherein AUTN and RAND are contained in an authenticate header.

13. The method of claim 9 wherein RES and AUTS are contained in an authorization header.

14. The method of claim 1, wherein the invoked procedure comprises an acknowledgement response comprising a SIP 200 code.

15. The method of claim 14 wherein RES and AUTS are contained in an authorization header.

16. The method of claim 14 wherein AUTN and RAND are contained in an authenticate header.

17. The method of claim 1 wherein AUTN and RAND are contained in an authenticate header.

18. The method of claim 1 wherein RES and AUTS are contained in an authorization header.

19. The method of claim 1 wherein RES and AUTS are contained in an authorization header.

20. A program storage device readable by a machine, tangibly embodying a program of instructions executable by the machine to perform a method of authenticating a user agent to a server using Session Initiation Protocol (SIP) messages, the method comprising:

forwarding a SIP request from the user agent to the server;

forwarding a request for authentication from the server to the user agent in response to the SIP request, the request for authentication including information that the authentication will be performed using a Universal Mobile Telecommunications System (UMTS) Authentication and Key Agreement (AKA) mechanism, wherein a field therein comprises AUTN (authentication token) and RAND (random challenge), and RAND and AUTN vectors are included in a SIP WWW-Authenticate or a Proxy-Authenticate response header field;

forwarding an authentication response from the user agent to the server in response to the request for authentication in accordance with the UMTS AKA mechanism wherein a field therein comprises RES (response) and AUTS (synchronization failure parameter); and performing an invoked SIP procedure on the server in response to the SIP request if the authentication is deemed successful in view of the authentication response.

21. The storage device of claim 20, wherein the SIP request comprises one of a SIP INVITE request or a SIP REGISTER request.

22. The storage device of claim 21 wherein AUTN and RAND are contained in an authenticate header.

23. The storage device of claim 21 wherein RES and AUTS are contained in an authorization header.

24. The storage device of claim 20, wherein the request for authentication comprises one of a SIP 401 Unauthorized code or a SIP 407 Proxy Authentication Required code.

25. The storage device of claim 24, wherein the RAND and AUTN vectors are included in a SIP WWWAuthenticate or a Proxy-Authenticate response header field.

26. The storage device of claim 24 wherein AUTN and RAND are contained in an authenticate header.

27. The storage device of claim 24 wherein RES and AUTS are contained in an authorization header.

28. The storage device of claim 25 wherein RES and AUTS are contained in an authorization header.

29. The storage device of claim 20, wherein the authentication response comprises an error code.

30. The storage device of claim 29, wherein the authentication response is included in a SIP Authorization or a Proxy-Authorization header field.

31. The storage device of claim 29 wherein AUTN and RAND are contained in an authenticate header.

32. The storage device of claim 29 wherein RES and AUTS are contained in an authorization header.

33. The storage device of claim 30 wherein AUTN and RAND are contained in an authenticate header.

34. The storage device of claim 30 wherein RES and AUTS are contained in an authorization header.

35. The storage device of claim 20, wherein the invoked procedure comprises an acknowledgement response comprising a SIP 200 code.

36. The storage device of claim 35 wherein AUTN and RAND are contained in an authenticate header.

37. The storage device of claim 35 wherein RES and AUTS are contained in an authorization header.

38. The storage device of claim 20 wherein AUTN and RAND are contained in an authenticate header.

39. The storage device of claim 20 wherein RES and AUTS are contained in an authorization header.

* * * * *